Jan. 18, 1966  C. S. HUGHES  3,230,283

METHOD OF PREPARING TILE SURFACES

Filed April 10, 1963

INVENTOR.
CALVIN S. HUGHES
BY
Lockwood, Woodard, Smith & Weikart
Attorneys 3,230,283
Patented Jan. 18, 1966

3,230,283
METHOD OF PREPARING TILE SURFACES
Calvin S. Hughes, Brazil, Ind., assignor to Ayer-McCarel Clay Co., Inc., Brazil, Ind., a corporation of Indiana
Filed Apr. 10, 1963, Ser. No. 272,068
1 Claim. (Cl. 264—62)

The present invention relates to a process for preparing a tile surface and more particularly to a process for placing a glaze on a tile surface and to the product thereof.

For certain building and structural applications, it is desirable to have a glazed surface on structural tile. Preferably, this glazed surface will have various colors which can be used as a part of a decorative scheme, for example, in hospital interiors and the like. A glazed surface is desirable for the reason that it permits easy cleaning and in fact, appears cleaner and maintains its cleanliness without actual cleaning for longer periods of time than a porous type of clay tile surface.

Consequently, a primary object of the present invention is to provide an improved method for applying a glaze to a clay structural tile.

Still another object of the present invention is to provide an improved method for glazing tile whereby the glazed tile has various colors.

Still further objects of the present invention are to provide a method of placing a more durable glaze upon clay tile, said glaze being waterproof, acid proof and weather resistant.

Still another object of the invention is to provide a clay tile product which is glazed on a plurality of surfaces some of which are colored.

Related objects and advantages will become apparent as the description proceeds.

One embodiment of the method of the present invention might include the steps of coating the clay unit with a mixture including:

Ball clay,
Nepheline syenite,
Silica, —400 mesh,
Kaolin,
Talc,
Mica,
Powdered zirconium silicate and a colored body stain, drying the resulting coating by placing the unit in a moving dry atmosphere, kiln burning the unit for 90 hours at a temperature of approximately 2,000° F., placing a salt vapor within the kiln, terminating the heat supply in the kiln and leaving the units in the kiln for at least four to five hours after the heat supply has been terminated whereby the vapor forms a glaze on the units.

One embodiment of the product of the present invention might include a clay body, a colored clay containing engobe coating a portion of said body, and a salt glaze covering said portion and also a further portion of said body.

The full nature of the invention will be understood from the accompanying drawings and the following description and claim.

Figure 1:
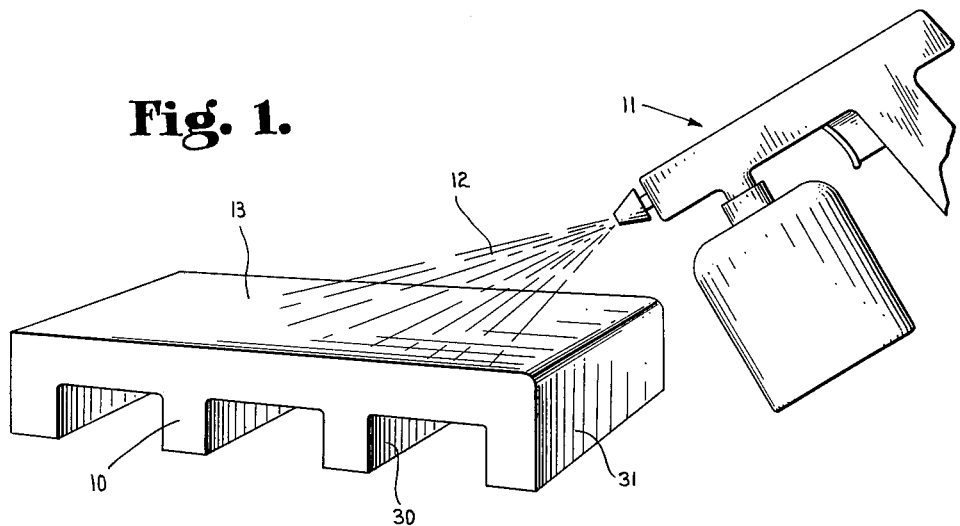
FIG. 1 is a perspective view of a structural clay tile and an adjacent spray gun showing one of the steps of the method of the present invention.
Figure 2:
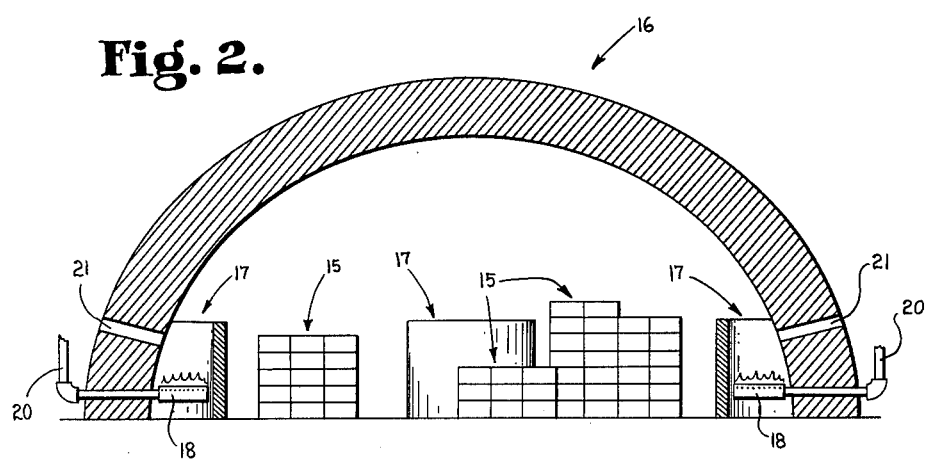
FIG. 2 is a vertical section taken through the center of a kiln used in the process of the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, the clay tile 10 is of conventional clay formed in the desired shape of the final tile product. As shown in FIG. 1, the tile has not yet been fired and consequently it still is in a relatively soft plastic condition. While in this condition, the tile is sprayed with a spray gun 11 so that the material 12 exhausted by the gun forms an engobe coating the surface 13 of the tile. The spray gun 11 is, for example, of the automatic or semi-automatic type manufactured by the De Vilbiss Company of Toledo, Ohio.

The material or composition 12 which is sprayed onto the surface 13 includes a number of chemicals which must be mixed in very exacting percentages of each chemical in order to produce a desired color, hardness and smoothness of the final glazed surface. One example of the spray composition would include the following chemicals with the following parts by weight:

| Chemicals: | Parts by weight (Base) |
|---|---|
| Ball clay | 20 |
| Nepheline syenite | 35 |
| Silica, —400 mesh | 10 |
| Kaolin | 30 |
| Talc | 5 |
| Mica | 5 |
| Powdered zirconium silicate (for opacity). A colored body stain including various ones of the following metallic oxides: antimony, titanium, alumina, chromium, manganese, vanadium, etc. | |

The following chart gives a number of examples of the different colors possible with the present invention. Parts are given by weight. The base of the engobe is the same for all of the examples. The various examples of colors are the above mentioned metallic oxides and are the products of the Ferro Corporation of Cleveland, Ohio, the numerical designations being those of the Ferro Corporation.

| | White | Pink | Gray | Aqua | Yellow | Blue | Lt. Gray |
|---|---|---|---|---|---|---|---|
| Base: | | | | | | | |
| Ball Clay | 20 | | | | | | |
| Nepheline Syenite | 35 | | | | | | |
| Silica —400 mesh | 10 | | | | | | |
| Kaolin | 30 | | | | | | |
| Talc | 5 | | | | | | |
| | 100 | 100 | 100 | 100 | 100 | 100 | 100 |
| Mica | 5 | 5 | 5 | 5 | 5 | 5 | 5 |
| Powdered zirconium silicate | 10 | | | | | | 8 |
| F-1846B Pink Body Stain | | 0.5 | | | | | |
| F-779B Gray Body Stain | | | 5 | | | | 2.5 |
| F-1943B Yellow Body Stain | | | | 0.25 | 2 | | |
| F-6629 Turquoise Body Stain | | | | 3.00 | | | |
| F-3272B Blue Body Stain | | | | | | 5 | |
| F2692B Green Body Stain | | | 0.5 | | | | 0.25 |

Also, the spray gun 11 preferably is used in such a manner as to coat the clay tile 10 to a thickness of .008 inch. The thickness of the coating should not vary over a few thousandths of an inch on any portion of the unit being sprayed or else a very definite color variation will be produced in the final product. Such a color variation is unacceptable to decorators and therefore, cannot be tolerated. Consequently, the coating is preferably placed on the surface to a thickness of .008 inch plus or minus .002 to .003 inch.

It has been found that if the average thickness of the coating is substantially less than the above mentioned preferred figure, the color of the glaze does not have the desired body or opaqueness and the glazed surface itself does not have the desired smoothness. On the other hand, if the thickness of the coating is substantially greater than the above mentioned preferred value, no substantial improvement in the final product results.

Therefore, the coating preferably has the above listed thickness in order that the desired effect is achieved but without expensive waste.

After the tile has been sprayed, it is placed within a dryer (not shown). Such a dryer is a completely conventional device and merely includes gas burners which cause heated air at a temperature of 220° F. to 240° F. to be moved across the surface of the tile for a period of 36 to 48 hours. During this period of time, the water is removed from the coating material 12 covering the tile as well as the tile itself.

After the tile 10 has been dried, it is stacked as shown in stacks 15 within a kiln 16. The kiln is conventional in nature and incorporates a plurality of fire boxes 17 having gas burners 18 located in the lower portions thereof, the gas for the burners 18 being supplied from the exterior of the kiln through pipes 20. As can be seen, the kiln has a dome shape which is interrupted by openings 21 leading into the kiln. The kiln is fired up in the conventional manner in order to "burn" or fire the clay until it assumes the conventional hard condition well known to tile and bricks.

This firing or burning procedure requires approximately 90 hours within the kiln. During this period of time, the temperature of the kiln is gradually built up to approximately 2000° F. It has been found that the final temperature can be varied as much as 50° F. above or below 2000° F. without affecting or interfering with the desired results of the present glazing process. It has also been found that occasionally it is desirable or necessary to lengthen the burning or firing time due to weather conditions and/or due to the condition of the tile in the kiln. For example, the tile within the kiln may sometimes be set within the kiln prior to its complete and thorough drying step. In such a situation, it is necessary to drive the moisture off before bringing the heat of the kiln up too rapidly or to as high a value. It has been found, therefore, that the firing time varies from approximately 80 to 120 hours but that the average best firing time is usually around 90 hours.

During the firing of the tile, rock salt is placed within the fire boxes 17 through the openings 21. Because of the high temperature (2000° F.) of the kiln, this salt first becomes molten and then goes into vapor form.

After the tile has been fired for 90 hours at the above mentioned temperature, the gas supply is terminated. The kiln is maintained closed for four or five hours after heat termination and the salt vapor within the kiln is deposited upon the surface 13 of each tile in the stacks of tile within the kiln, the temperature dropping during this four to five hour period to perhaps 1950° F. As a result, a hard smooth glazed surface which is waterproof and acid resistant is produced, this surface being suitable for outdoor or indoor construction. The color of the surface, of course, depends, as set forth above, upon the composition 12 placed upon the surface 13 prior to the salt deposition operation. After about four or five days, the kiln will have cooled off sufficiently to permit men to enter the kiln for removal of the final product.

It is believed that there is a chemical reaction between the clay, the coating and the salt. In the case of the engobe, the iron, silica and alumina go into solution fusing the glaze (either salt or engobe) to the clay body. In the case of the salt glaze, a glass is formed on the tile surface.

It has been found that it is critical to provide a mixture or composition 12 which will adhere to the clay tile before and after the firing operation. This is true because of the fact that the clay shrinks during the firing and, therefore, the coating 13 must also shrink the same amount. The above listed examples have been found to have the proper shrinking property.

As an alternative to the above spraying operation, the tile can be dipped within the composition listed below.

| Components: | Parts by weight |
|---|---|
| Lead bearing frit (such as #3531 of the Ferro Corporation of Cleveland, Ohio) | 42.4 |
| Nepheline syenite (such as B100 or B200 of the Ferro Corporation) | 22.4 |
| Talc | 7.0 |
| Clays used in the plant tile production | 28.2 |

Dipping of the clay tile within this coloring composition is performed as an alternative step to the above mentioned spraying operation. The various other steps involved in the present embodiment such as the heating and the addition of salt to produce a salt vapor are identical to those steps above described.

It has been found that the present invention produces tile having the desired smooth, waterproof, acid proof surface. It has also been found that tile produced according to the present invention is weather resistant and can be used in outdoor as well as indoor building construction.

It should be pointed out that the colored engobe covers the flat surface 13 while the glaze formed by the salt vapor covers all the surfaces of the tile, such as, for example, the surfaces 30, 31, etc.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

A process for glazing tile surfaces which comprises the steps of:

(a) Forming clay into the form of the tile product;

(b) Coating the formed clay unit with a mixture containing 20 parts by weight of ball clay, 35 parts by weight of nepheline syenite, 10 parts by weight of silica, 30 parts by weight of kaolin, 5 parts by weight of talc, 5 parts by weight of mica and colored body stains, to a thickness of about 0.006 to 0.011 inch;

(c) Drying the coated formed clay structures at a temperature of about 221° F. to 240° F. for about 36 to 48 hours;

(d) Firing the formed coated clay units in a kiln heated to a temperature of about 1950° F. to 2050° F. over a period of 80 to 120 hours;

(e) Generating a molten salt vapor within the kiln by placing rock salt within the kiln while it is at a temperature of about 2000° F., thereby forming a glaze on the surface of the tile;

(f) Closing the kiln and terminating the heat supply to the kiln;

(g) Leaving the units in the closed kiln for a period of at least 4 to 5 hours;
(h) Recovering the salt glazed tile product.

References Cited by the Examiner
UNITED STATES PATENTS

| | | | |
|---|---|---|---|
| 1,867,294 | 7/1932 | Whitacre | 264—62 |
| 2,683,096 | 7/1954 | Eckert et al. | 106—48 |
| 2,774,681 | 12/1956 | Huppert et al. | 106—48 |
| 2,855,655 | 10/1958 | Dressler et al. | 117—125 |
| 2,856,368 | 10/1958 | MacIntyre et al. | 106—48 |
| 2,877,532 | 3/1959 | Heine | 117—125 |
| 3,090,094 | 5/1963 | Schwartzwalder et al. | 156—89 |

EARL M. BERGERT, *Primary Examiner.*